United States Patent
Xu et al.

(10) Patent No.: US 11,232,902 B2
(45) Date of Patent: Jan. 25, 2022

(54) METHOD FOR RECOVERY OF $Nd_2Fe_{14}B$ GRAINS FROM BULK SINTERED Nd—Fe—B MAGNETS AND/OR MAGNET SCRAPS BY ELECTROCHEMICAL ETCHING

(71) Applicant: INSTITUT JOZEF STEFAN, Ljubljana (SI)

(72) Inventors: Xuan Xu, Ljubljana (SI); Saso Sturm, Visnja Gora (SI); Kristina Zuzek Rozman, Ljubljana (SI)

(73) Assignee: Institut Jožef Stefan, Ljubljana (SI)

( * ) Notice: Subject to any disclaimer, the term of this patent is extended or adjusted under 35 U.S.C. 154(b) by 163 days.

(21) Appl. No.: 16/687,749

(22) Filed: Nov. 19, 2019

(65) Prior Publication Data

US 2020/0168395 A1    May 28, 2020

(30) Foreign Application Priority Data

Nov. 27, 2018  (EP) .................... 18 208 508

(51) Int. Cl.
  *H01F 41/02* (2006.01)
  *C22B 59/00* (2006.01)
  *H01F 1/057* (2006.01)
  *C25F 3/02* (2006.01)

(52) U.S. Cl.
  CPC ......... *H01F 41/0253* (2013.01); *C22B 59/00* (2013.01); *C25F 3/02* (2013.01); *H01F 1/0577* (2013.01); *Y02P 10/20* (2015.11)

(58) Field of Classification Search
  CPC .................... C25F 3/02; H01F 1/057–0579
  See application file for complete search history.

(56) References Cited

U.S. PATENT DOCUMENTS 5,362,459 A * 11/1994 Greenberg ............ C01F 17/265
                                                      423/21.1
2016/0125985 A1 * 5/2016 Yang ..................... C23C 14/325
                                                      335/302

OTHER PUBLICATIONS

Yang, Y.X., et al., *Ree Recovery from End-of-Life NdFeB Permanent Magnet Scrap: A Critical Review.* Journal of Sustainable Metallurgy, 2017. 3(1): p. 122-149.
Gutfleisch, O., et al., *Magnetic Materials and Devices for the 21st Century: Stronger, Lighter, and More Energy Efficient.* Advanced Materials, 2011. 23(7): p. 821-842.

(Continued)

*Primary Examiner* — Ho-Sung Chung
(74) *Attorney, Agent, or Firm* — Renner Kenner Greive Bobak Taylor & Weber (57) ABSTRACT

The invention relates to a method for recovery of $Nd_2Fe_{14}B$ grains from bulk sintered Nd—Fe—B magnets and/or magnet scraps. In this method the Nd—Fe—B magnets (1) and/or magnet scraps are anodically oxidized using a non-aqueous liquid electrolyte (5), said anodic oxidation releasing the $Nd_2Fe_{14}B$ grains (6) in said Nd—Fe—B magnets (1) and/or magnet scraps. The released $Nd_2Fe_{14}B$ grains (6) are collected during and/or after said anodic oxidation. The proposed method allows a more environmental friendly and cost-effective way for recycling EOL Nd—Fe—B magnets/Nd—Fe—B magnet scraps.

11 Claims, 4 Drawing Sheets

(56) References Cited

OTHER PUBLICATIONS

Zhu, X.P., et al., *Solubility of RE2O3 (RE =La and Nd) in light rare earth fluoride molten salts*. Journal of Rare Earths, 2018. 36(7): p. 765-771.
Zhou, H., et al., *The recovery of rare earth by a novel extraction and precipitation strategy using functional ionic liquids*. Journal of Molecular Liquids, 2018. 254: p. 414-420.
Weng, Z., et al., *Assessing the energy requirements and global warming potential of the production of rare earth elements*. Journal of cleaner production, 2016. 139: p. 1282-1297.
Goodenough, K.M., F. Wall, and D. Merriman, *The rare earth elements: demand, global resources, and challenges for resourcing future generations*, Natural Resources Research, 2018. 27(2): 201-216.
Reck, B.K. and T.E. Graedel, *Challenges in metal recycling*. Science, 2012. 337(6095); p. 690-695.
Binnemans, K., et al., *Recycling of rare earths: a critical review*. Journal of cleaner production, 2013. 51: p. 1-22.
Venkatesan, P., et al., *Selective electrochemical extraction of REEs from NdFeB magnet waste at room temperature*. Green Chemistry, 2018. 20(5): p. 1065-1073.
Jin, H.Y., et al., *Life Cycle Assessment of Neodymium-Iron-Boron Magnet-to-Magnet Recycling for Electric Vehicle Motors*. Environmental Science & Technology, 2018. 52(6); p. 3796-3802.
Firdaus, M., et al., *Review of high-temperature recovery of rare earth (Nd/Dy) from magnet waste*. Journal of Sustainable Metallurgy, 2016. 2(4): p. 276-295.
Zakotnik, M. and C. Tudor, *Commercial-scale recycling of NdFeB-type magnets with grain boundary modification yields products with 'designer properties' that exceed those of starting materials*. Waste management, 2015. 44: p. 48-54.
Zakotnik, M., I. Harris, and A. Williams, *Possible methods of recycling NdFeB-type sintered magnets using the HD/degassing process*. Journal of Alloys and Compounds, 2008. 450(1-2): p. 525-531.
Farr, M., *Production of anisotropic injection moulded NdFeB magnets from end-of-life sintered magnets*. 2018, University of Birmingham.
Lixandru, A., et al., *A systematic study of HDDR processing conditions for the recycling of end-of-life Nd—Fe—B magnets*. Journal of Alloys and Compounds, 2017. 724: p. 51-61.
Itoh, M., et al., *Recycling of rare earth sintered magnets as isotropic bonded magnets by melt-spinning*, Journal of alloys and compounds, 2004, 374(1-2): p. 393-396.
Meakin, J., et al., *3-D laser confocal microscopy study of the oxidation of NdFeB magnets in atmospheric conditions*. Applied Surface Science, 2016. 378: p. 540-544.
Zakotnik, M., I. Harris, and A. Williams, *Multiple recycling of NdFeB-type sintered magnets*. Journal of Alloys and Compounds, 2009. 469(1-2): p. 314-321.
Shirayama, S. and T.H. Okabe, *Selective Extraction and Recovery of Nd and Dy from Nd—Fe—B Magnet Scrap by Utilizing Molten MgCl2*. Metallurgical and Materials Transactions B-Process Metallurgy and Materials Processing Science, 2018. 49(3): p. 1067-1077.
Abbasalizadeh, A., et al., *Electrochemical Recovery of Rare Earth Elements from Magnets: Conversion of Rare Earth Based Metals into Rare Earth Fluorides in Molten Salts*. Materials Transactions, 2017. 58(3): p. 400-405.
Konishi, H., et al., *Electrochemical separation of Dy from Nd magnet scraps in molten LiCl-KCl*. Transactions of the Institutions of Mining and Metallurgy Section C-Mineral Processing and Extractive Metallurgy, 2016. 125(4): p. 216-220.
Fukumoto, M., Y. Sato, and M. Hara, *Recovery of Dy from a Mixture of Nd, Fe, B and Dy by Electrolysis in Molten LiCl*. Materials Transactions, 2016. 57(8): p. 1327-1331.
Yue, M., et al., *Recycling of Nd—Fe—B Sintered Magnets Sludge via the Reduction—Diffusion Route to Produce Sintered Magnets with Strong Energy Density*. ACS Sustainable Chemistry & Engineering, 2018. 6(5): p. 6547-6553.
Hua, Z., et al., *Selective extraction of rare earth elements from NdFeB scrap by molten chlorides*. ACS Sustainable Chemistry & Engineering, 2014. 2(11): p. 2536-2543.
Kitagawa, J. and R. Uemura, *Rare Earth Extraction from NdFeB Magnet Using a Closed-Loop Acid Process*. Scientific Reports, 2017. 7.
Hole, J., S. Beseničar, and D. Kolar, *A study of Nd2Fe14B and a neodymium-rich phase in sintered NdFeB magnets*. Journal of Materials Science, 1990. 25(1): p. 215-219.
Ramesh, R., J. Chen, and G. Thomas, *On the grain-boundary phase in iron rare-earth boron magnets*. Journal of applied physics, 1987. 61(8): p. 2993-2998.
Wang, S. and Y. Li, *In situ TEM study of Nd-rich phase in NdFeB magnet*. Journal of Magnetism and Magnetic Materials, 2005, 285(1-2): p. 177-182.
Search Report dated Apr. 24, 2019 in related application No. EP 18208508.4.
Venkatesan, P. et al., *Selective Extraction of Rare-Earth Elements from NdFeb magnets by a Room-Temperature Electrolysis Pretreatment Step*, ACS Sustainable Chemistry & Engineering, No. 6, May 2001, pp. 9375-9382.
Szymanski, M. et al., *Recycling of Nd—Fe—B Magnets from scrap hard disc drives*, Key Engineering Materials, vol. 682, Feb. 2016, pp. 308-313.
Venkatesan, P., et al. *An environmentally friendly electro=oxidative approach to recover valuable elements from NdFeB magnet waste*, Separation and Purification Technology, vol. 191, Sep. 2017, pp. 384-391.

\* cited by examiner

METHOD FOR RECOVERY OF $Nd_2Fe_{14}B$ GRAINS FROM BULK SINTERED ND—FE—B MAGNETS AND/OR MAGNET SCRAPS BY ELECTROCHEMICAL ETCHING

FIELD OF INVENTION

The present invention relates to a method for recovery of $Nd_2Fe_{14}B$ grains from bulk sintered Nd—Fe—B magnets and/or magnet scraps.

Neodymium iron boron (Nd—Fe—B) magnets are widely used in many applications such as hard disk drives, wind turbines, industrial motors, acoustic transducers and electric vehicles due to their high energy density [1]. Since they incorporate 20-30 wt % of rare earth elements (REEs) that include mainly Nd with small addition of Dy and/or Tb, they represent an important secondary REEs resource [2]. In 2014, 22% of rare-earth oxides (REOs) were consumed for the production of Nd—Fe—B magnets globally which makes them one of the largest applications among all REEs [3]. The demand for REEs was estimated to grow by >8% per annum until 2020 [4]. Since primary mining of REEs leads to a large environmental footprint associated with chemical usage and harmful emissions [5] and the REEs are considered the most critical based on their economic importance and supply risk [6]. Despite their criticality, currently, less than 1% of REEs are being recycled from end of life products [7]. Up to 30% of the starting REE alloy can be lost during the magnet manufacturing process [8]. Therefore, the recycling of the end-of-life Nd—Fe—B magnets or other magnet scraps has been considered as an important strategy to reduce the environmental risks related to rare earth mining and overcome the supply risk of REEs [9, 10].

BACKGROUND OF INVENTION AND PRIOR ART

Diverse methodologies hitherto for recycling Nd—Fe—B magnets have been summarized in detail by many authors [1, 8, 11]. The recycling approaches can be broadly classified into physical/mechanical processing, pyrometallurgical and hydrometallurgical seperation & recovery. Physical/mechanical processing, including resintering [12, 13], hydrogenation disproportionation desorption and recombination (HDDR) [14-16], recasting and melt spinning [17] of sintered Nd—Fe—B magnet scrap will typically have a smaller environmental footprint compared to recycling routes, which rely on stripping of the REEs. However, the potential disadvantages arise about the high oxygen content (typically 2000-5000 ppm oxygen) entrained in the REE-rich grain boundary phase [18]. The oxide could not be extracted out, because of which grain boundary modification is required by adding REE metals or REEs-containing alloys [13, 19]. The pyrometallurgical routes can be used to remelt the REE alloys and extract the different REE in the form of oxide, halide, fluoride or other metallic compound which can then be reduced to metallic form [20-25]. However, these pyrometallurgical processes operate at a temperature of around 750-950° C. and are thus energy intensive. Hydrometallurgical recycling processes designed for Nd—Fe—B magnets are promising due to the mild operating temperature, relatively simple equipment and the continuous separation ability [4, 9]. In hydrometallurgical processes, however, Nd—Fe—B magnets are completely dissolved with an acid. The roasting pretreatment at 900° C. is generally required. Iron, which is the major component of Nd—Fe—B magnets (60-70%) consumes large amount of acid, alkali and other precipitation agents that cannot be recycled in the whole process [8, 9]. REEs are concentrated by solvent extraction and then are precipitated with either oxalic or carbonic acid. The precipitate is further calcined at 950° C. to form REOs, which can then be returned to the initial manufacturing process for Nd—Fe—B magnets [26]. To summarize, the magnet-REEs-magnet recycling requires large amounts of chemicals and considerable energy with harmful emissions to the environment. Generally, sintered Nd—Fe—B magnets contain 87-92% $Nd_2Fe_{14}B$ phase which is barely oxidized due to the protection of the grain boundary (typically Nd-rich phase) [18, 27]. Therefore, instead of recovering REEs from the end-of-life Nd—Fe—B magnets or magnet scraps, direct recovery of the $Nd_2Fe_{14}B$ phase for fresh NdFeB magnets making would dramatically reduce the chemical usage and energy consumption. However, up to date a facile, energy efficient and environmentally friendly route for recovery of the $Nd_2Fe_{14}B$ phase is yet to be presented.

The various approaches for recycling Nd—Fe—B magnets have been investigated worldwide. One of these approaches is to bulk-recycle all the materials in an Nd—Fe—B magnet without separation. This has been termed "magnet-to-magnet recycling". For instance, the hydrogenated Nd—Fe—B powder from voice coil motors (VCMs) was used to produce sintered magnets. After a brief milling treatment, the powder was aligned, pressed and re-sintered and this procedure was repeated four times with a progressive fall in the density (7.56-6.70 g $cm^{-3}$) and in the magnetic properties (remanence: 1180-1053 mT, coercivity: 870-343 kA $m^{-1}$). The chemical analysis indicated that this was due to the progressive oxidation of the Nd-rich material (oxygen content: 1.84-4.12 at. %) and to some Nd loss by evaporation (neodymium content: 13.78-13.02 at. %). On resintering, the grain boundary phase no longer melts due to the higher melting point of the oxide and therefore full density cannot be achieved in the resintered magnets. Therefore, extra REE metals/alloys has to be added to aid liquid phase in the grain boundary during sintering, in order to achieve full density. [Zakotnik, M., I. Harris, and A. Williams, *Multiple recycling of NdFeB-type sintered magnets. Journal of Alloys and Compounds*, 2009. 469(1-2): p. 314-321 and Zakotnik, M. and C. Tudor, *Commercial-scale recycling of NdFeB-type magnets with grain boundary modification yields products with 'designer properties' that exceed those of starting materials. Waste management*, 2015. 44: p, 48-54].

Other bulk-recycling approaches such as resintering, hydrogenation disproportionation desorption and recombination (HDDR), recasting and melt spinning of sintered Nd—Fe—B magnet scrap have been investigated as well. Since the bulk-recycling of Nd—Fe—B magnets leaves the REOs phase to remain in the grain boundary without seperation, higher REOs content with the repeated recycling could not be avoided which significantly degrades the magnetic properties. The addition of extra extra REE metals/alloys would results in higher cost for recycled magnets making. [Lalana, E. H., et al. *Recycling of Rare Earth Magnets by Hydrogen Processing and Re-Sintering. in European Congress and Exhibition on Powder Metallurgy. European PM Conference Proceedings*. 2016. The European Powder Metallurgy Association. Lixandru, A., et al., *A systematic study of HDDR processing conditions for the recycling of end-of-life Nd—Fe—B magnets. Journal of Alloys and Compounds*, 2017. 724: p. 51-61. Itoh, M., et al., *Recycling of rare earth sintered magnets as isotropic bonded* magnets by melt-spinning. *Journal of alloys and compounds*, 2004. 374(1-2): p. 393-396].

Extraction of all the REEs from NdFeB magnets for new magnet production is an alternative way for recycling. This could be termed "magnet-REEs-magnet recycling". High-temperature processing of Nd—Fe—B magnet is to selectively convert REEs in the magnet into another phase (i.e., from metallic RE to RE chlorides) which separates the main non-REE components. The separated REEs in the other phase can be used for RE metal production through molten salt electrolysis or metallothermic reduction. Nd—Fe—B magnet scrap can be selectively extracted using molten $MgCl_2$—KCl salts at temperatures of 600-1200° C. REs in the scrap are transformed to $RECl_3$ ($2RE + 3MgCl_2 = 2RECl_3 + 3Mg$) where the overall extraction efficiency for REs can reach >90%, [Hua, Z., Wang, J., Wang, L., Zhao, Z., Li, X., Xiao, Y and Yang, Y., *Selective extraction of rare earth elements from NdFeB scrap by molten chlorides*. ACS Sustainable Chemistry & Engineering, 2014. 2(11): p. 2536-2543].

Other selective extraction of REEs by liquid metal extraction, molten slag extraction, direct melting and direct electrochemical refining can also realize high REEs recovery efficiency. [Moore, M., et al., *A route for recycling Nd from Nd—Fe—B magnets using Cu melts. Journal of Alloys and Compounds*, 2015. 647: p. 997-1006. Yang, Y., S. Abrahami, and Y. Xiao. *Recovery of rare earth elements from EOL permanent magnets with slag extraction.* in *Proceedings of the 3rd International Slag Valorisation Symposium*, 2013. Bian, Y, et al., *Recovery of rare earth elements from NdFeB magnet by VIM-HMS method. ACS Sustainable Chemistry & Engineering*, 2016. 4(3): p. 810-818. Kamimoto, Y., et al., *Recovery of rare-earth elements from neodymium magnets using molten salt electrolysis. Journal of Material Cycles and Waste Management*, 2016: p. 1-5].

High-temperature processing of Nd—Fe—B magnet generally operates at a temperature of around 750-950° C. and is thus energy intensive. Hydrometallurgical recycling processes operated at a mild temperature to recover REEs are alternative methods for Nd—Fe—B magnets recycling. Conventionally, Nd—Fe—B magnet scraps are milled with/without roasting (annealing in air). The obtained powders are completely dissolved in concentrated $HCl/H_2SO_4$ solutions. Subsequently, REEs can be precipitated from leach solutions by adding oxalic acid or hydrogen fluoride to form oxides or fluorides. The recovery of REEs can reach over 90%. [Bandara, H. D., K. D. Field, and M. H. Emmert, *Rare earth recovery from end-of-life motors employing green chemistry design principles. Green Chemistry*, 2016. 18(3): p. 753-759. Peelman, S., J. Sietsma, and Y Yang, *Recovery of Neodymium as (Na, Nd)(SO$_4$)$_2$ from the Ferrous Fraction of a General WEEE Shredder Stream. Journal of Sustainable Metallurgy*, 2018: p. 1-12].

Recently, studies on selective leaching of the REEs have been reported. However, selective leaching of REEs in the magnet scrap is challenging due to the presence of large amount of Fe in the magnet alloy and in the scrap. Quite often a high temperature treatment is needed to completely convert all the metallic phases to oxides which increases the selectivity of REEs over Fe and other transition metal elements. [Lee, C.-H., et al., *Selective leaching process for neodymium recovery from scrap Nd—Fe—B magnet. Metallurgical and Materials Transactions A*, 2013. 44(13): p. 5825-5833. Yoon, H.-S., et al., *The effect of grinding and roasting conditions on the selective leaching of Nd and Dy from NdFeB magnet scraps. Metals*, 2015. 5(3): p. 1306-1314. Vander Hoogerstraete, T, et al., *From NdFeB magnets towards the rare-earth oxides: a recycling process consuming only oxalic acid. RSC Advances*, 2014. 4(109): p. 64099-64111].

In recent patents on recycling of spent or scrapped Nd—Fe—B magnets, efforts were paid on 1) resintering of milled waste materials mixed with raw sintered Nd—Fe—B powder/REE metal (alloys) and 2) selective recovery of REEs from completely leached magnet solution or high temperature molten salts. Selective recovery of $Nd_2Fe_{14}B$ grains from waste Nd—Fe—B magnets has not yet reported up to date. [Sun, B. and Y Duan, *High-performance NdFeB permanent magnet produced with NdFeB scraps and production method thereof.* 2017, Google Patents. Berggren, M., et al., *Rare Earth Materials Recovery System*. 2018, Google Patents. Harris, I. R., A. Walton, and J. D. Speight, *Magnet recycling*. 2017, Google Patents. Taylor, P. R. and B. N. Carlson, *EXTRACTION OF RARE EARTH METALS FROM NdFeB USING SELECTIVE SULFATION ROASTING*. 2016, Google Patents. Harris, I. R., et al., Magnet recycling. 2014, Google Patents].

In summary, the "magnet-to-magnet recycling" of Nd—Fe—B magnets leaves the REOs phase to stay in the grain boundary without any seperation, higher REOs content with the repeated recycling could not be avoided which significantly degrades the magnetic properties. The addition of extra extra REE metals/alloys would results in higher cost for recycled magnets making. While the proposed "magnet-REEs-magnet recycling" of Nd—Fe—B magnets requires either high energy input or multiple process steps with consumption of large amount of chemicals which generates large amount of waste and effluents.

DESCRIPTION OF THE INVENTION

In view of the problems associated with the recycling of EOL (end-of-life) Nd—Fe—B magnets/Nd—Fe—B magnet scraps, it is an object of the present invention to provide a more environmental friendly and cost-effective way for Nd—Fe—B magnet recycling.

The object is achieved with the method according to claim 1. Advantageous embodiments of the method are subject of the dependent claims or can be deduced from the subsequent portions of the description.

In the proposed method $Nd_2Fe_{14}B$ grains are recovered from bulk sintered Nd—Fe—B magnets and/or magnet scraps. The Nd—Fe—B magnets are typically magnet scraps, but the method is not limited to magnet scraps. The EOF Nd—Fe—B magnets contain up to 90% alloy phases which are suitable for electrochemical recycling. Nd—Fe—B magnet scraps are arising from cutting block magnets into shape or off-quality magnets, which can be suitable as an input for direct recycling processes (e.g. remelting). The wet swarf from magnet finishing processes is only suitable for indirect recycling processes, since the material is contaminated and partly oxidized.

The $Nd_2Fe_{14}B$ grains are recovered by electrochemical etching of the bulk sintered Nd—Fe—B magnets or magnet scraps using an anodic oxidation process. In this process the metallic Nd-rich phase (Nd(0)) in the grain boundaries is oxidized to $Nd^{3+}$ as ions on the anode. The liquid electrolyte used in this process is formed of a non-aqueous solvent in order to prevent the $Nd_2Fe_{14}B$ grains from oxidation. This allows direct reuse of the collected $Nd_2Fe_{14}B$ grains for new magnet making. Generally, the grain boundaries of the Nd—Fe—B magnets and/or magnet scraps contain metallic Nd and Nd-oxides ($NdO_x$) [28, 29]. The metallic Nd in the Nd-rich grain boundary phase is preferentially etched/oxidized and dissolved in the non-aqueous solvent. Due to this anodic oxidation the $Nd_2Fe_{14}B$ grains in the Nd—Fe—B magnets and/or magnet scraps are released. The released magnetic $Nd_2Fe_{14}B$ grains are then collected, preferably by using an external magnetic field gradient, provided via e.g., commercial Nd—Fe—B magnet. The non-magnetic particles that mainly consist of Nd-rich metal and oxides are preferably recovered by filtration. The dissolved Nd-rich phase in the electrolyte can be further separated and recovered in the form of REOs, the technique of which has been well known publically.

The applications of interest include the recovery of $Nd_2Fe_{14}B$ grains ready for new magnet making and recovery of REEs ready for RE metal production by a facile, energy efficient and environmentally friendly route. Preferably the electrochemical etching of the Nd—Fe—B magnets and/or magnet scraps is performed in a three-electrode cell—having an anode, a cathode and a reference electrode—where one or several scrapped or EOL bulk sintered Nd—Fe—B magnets (after the coating is removed) serve(s) as the anode, preferably a Cu foil is used as the cathode and a Pt wire is applied as the reference electrode. In a preferred embodiment dehydrated $FeCl_2$ (to improve the electrolyte conductivity) is dissolved in the liquid electrolyte, e.g. in dimethylformamide (DMF) as the electrolyte. The $Nd_2Fe_{14}B$ grains can be collected on the anodic part magnetically by a Nd—Fe—B magnet after applying the anodic current density (2~48 $mA \cdot cm^{-2}$).

On an industrial level, a conductive netting mesh which is commonly used in the industry can be used together with the collected end-of-life bulk magnets or the magnet scraps to form the anode. Such a netting mesh typically holds around 10 kg Nd—Fe—B magnets.

This proposed anodic etching process of Nd—Fe—B magnets is acid-free and operating at room temperature. Generally, the temperatures can range from 0° C. to about 90° C. On the cathode part, simultaneously, the Fe deposition occurs with a high current efficiency, due to the application of a non-aqueous solvent (e.g. DMF). The collected $Nd_2Fe_{14}B$ grains are not oxidized and are ready for a direct new magnet production.

The obtained metallic Fe on the cathode coming from electrodeposition can be used as a raw material for different applications.

BRIEF DESCRIPTION OF THE DRAWINGS

The proposed method will be described in the following by way of example in connection with the accompanying figures showing.

EXAMPLE FOR CARRYING OUT THE INVENTION

In the following example of the proposed method $Nd_2Fe_{14}B$ grains are recovered from an EOF Nd—Fe—B magnet using dimethylformamide as the liquid electrolyte.

Regents

Dimethylformamide (DMF, >99%) was purchased from Sigma-Aldrich, Germany. Prior to using, molecular sieves (4A, Sigma-Aldrich, China) which were dried under vacuum at 160° C. for more than 24 hours was added into DMF to remove the water. $FeCl_2 \cdot 4H_2O$ (>99.99%, Sigma-Aldrich) were dehydrated under vacuum at 140° C. for 24 hours. All dried chemicals were stored inside a closed bottle in an argon filled glove box with water and oxygen content below 1 ppm. The water concentration which was determined by Karl Fischer titration (C20S, Mettler-Toledo, Switzerland) in the electrolyte was less than 50 ppm. The sintered bulk Nd—Fe—B magnet waste (chemical composition: 66.34 wt. % Fe, 22.10 wt. % Nd, 5.78 wt. % Dy, 5.78 wt. % other elements) used in this example was supplied by Magneti Ljubljana d.d (Ljubljana, Slovenia). Prior to experiment, these bulk magnets were thermally demagnetized and mechanically polished to remove the coating.

Instrumentation

Figure 1:
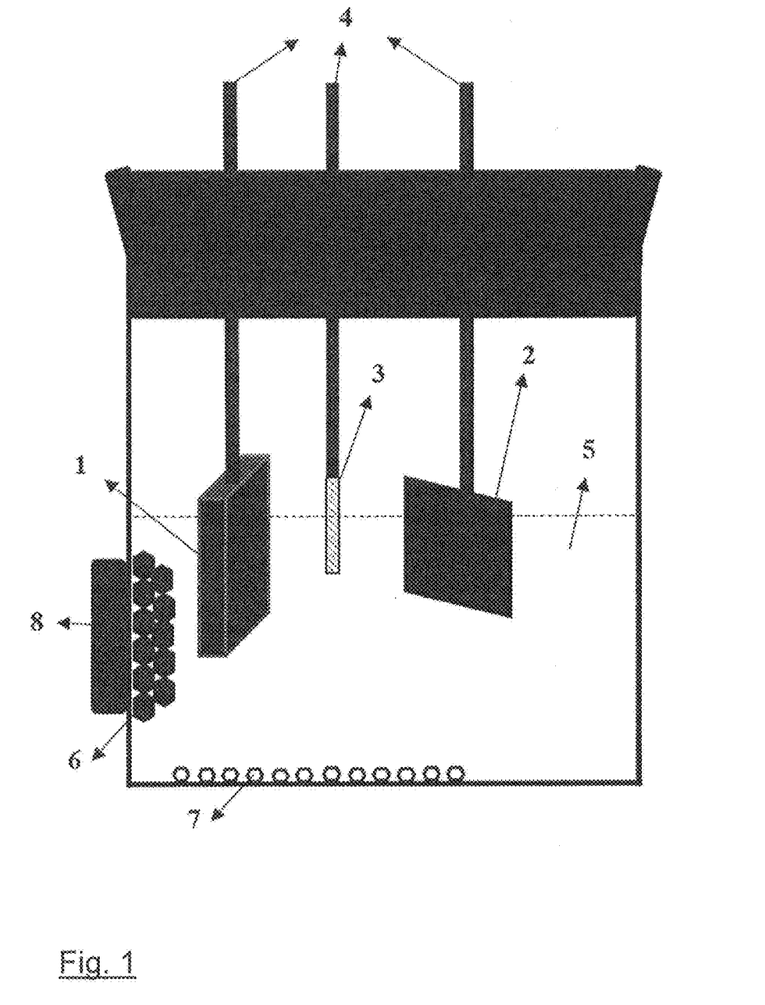
FIG. 1 a schematic illustration of an electrochemical cell for recovering $Nd_2Fe_{14}B$ grains from Nd—Fe—B magnets according to the proposed method.

With reference to the schematic illustration in FIG. 1, an electrochemical cell usable in the proposed method compromises the Nd—Fe—B magnet scrap 1 (15 mm*30 mm*2 mm) the coating of which was removed prior processing as the anode, a metallic counter electrode 2 (10 mm*10 mm) as the cathode and e.g. a Pt wire 3 (0.5 mm diameter) as the reference electrode. For work in the laboratory, the electrodes were attached to the electrical conductors 4 for connection to electrical instrumentation power supply (not shown). The cathode as shown can be a substrate material such as copper in the form of foil or plate. The electrolyte 5 that surrounds the three electrodes must be a non-aqueous solvent. Organic solvents such as dimethylformamide (DMF), acetonitrile, ethanol et. al. and deep eutectic solvents (DESs) such as choline chloride-ethylene glycol are suitable for this purpose. The particles illustrated at 6 in FIG. 1 are Nd2Fe14B grains that fall out of the Nd—Fe—B magnet 1 forming the anode after the Nd-rich grain boundary phase is etched away electrochemically, collected by an external (commercial Nd—Fe—B) magnet 8. The non-magnetic particles 7 that fell out of the Nd—Fe—B magnet 1 forming the anode together with Nd2Fe14B grains 6 are Nd-based oxides.

EXAMPLE

The proposed method is performed in this example using the three-electrode cell of FIG. 1 with 15 mL DMF containing 0.3 M $FeCl_2$ at room temperature. A Nd—Fe—B magnet (15 mm*30 mm*2 mm) is served as the anode, a Cu foil (10 mm*10 mm) is used as the cathode and a Pt wire (0.5 mm diameter) is applied as the reference electrode. Electrochemical etching of the Nd—Fe—B magnet started by applying the current density of 2-48 $mA \cdot cm^{-2}$ on the anode. The morphology of the anode was examined by SEM. In order to collect enough particles and investigate the etching efficiency of REEs, an electrochemical etching experiment with applied current density of 2 $mA \cdot cm^{-2}$ for 6 hours was conducted. Since the magnetic particles formed after etching tend to be attracted by the anode, therefore, for magnetic particles collection, at every one hour interval the etched anode was manually put close to the external magnet to separate these particles from anode. The metallic Nd which was not completely etched in the grain boundaries dropped down to the bottom of the cell together with $NdO_x$ and was collected by filtration of the electrolyte after etching. After electrochemical etching, the collected particles are collected magnetically and washed 3 times using DMF. The cleaned particles are then put in a vacuum chamber to evacuate DMF overnight for further characterization. The REEs concentration in the solution was measured by ICP-MS.

Figure 2:
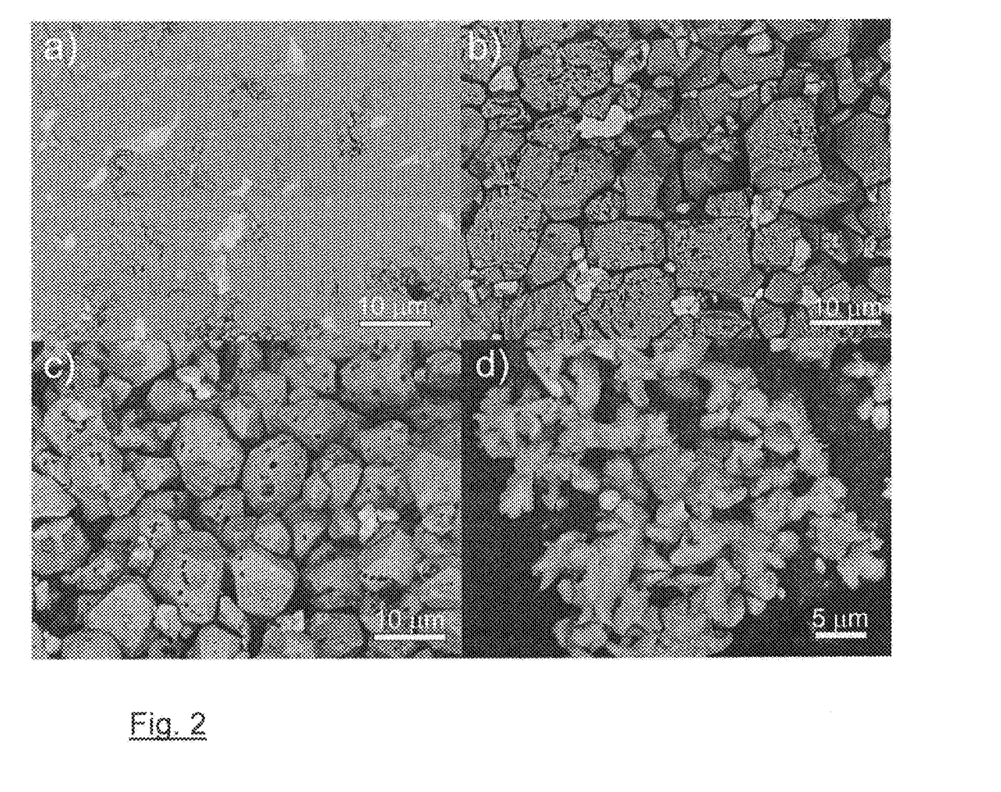
FIG. 2 Backscattered electron images of (a) Bulk sintered Nd—Fe—B scrap before electrochemical etching, (b) Bulk sintered Nd—Fe—B scrap after electrochemical etching (15 min), (c) Collected magnetic powder after electrochemical etching (360 min) and (d) Collected Nd-rich phase by filtration after electrochemical etching (360 min) (Etching conditions: 2 $mA \cdot cm^{-2}$, room temperature, no stirring)

The initial sintered bulk Nd—Fe—B magnet (FIG. 2a (BEI SEM)) consists of $Nd_2Fe_{14}B$ matrix phase (grey) with the grains size of ~10 μm, $Nd_2Fe_4B_x$ phase found in triple pockets (light grey), together with $Nd_2O_3$ phase (white). On the grain boundaries the Nd-rich (Nd—Fe) grain boundary phase (bright phase) is present, however the analysis with the SEM is not reliable in our case. This bright intergranular phase is Nd-rich, the structure of which most probably consists of α-Nd (fcc) and a mixture of different Nd-based oxides (dhcp-$Nd_2O_3$, fcc-NdO, complex-$Nd_2O_3$ and h-$Nd_2O_3$) [29]. FIG. 2b (BEI SEM) shows a representative microstructure of the Nd—Fe—B magnet surface after electrochemical etching at 2 $mA \cdot cm^{-2}$ for 15 min under room temperature. It can be observed that the metallic Nd-rich grain boundary (bright phase, FIG. 2b) was etched away, exposing the grains of $Nd_2Fe_{14}B$ matrix phase and leaving behind the Nd-oxide phases (white phase on FIG. 2b) which are not prone to be electrochemically oxidised i.e. etched. Some vacancies observed on the surface of the magnet after etching indicate that some grains of the $Nd_2Fe_{14}B$ matrix phase are detached from the magnet body. The etching front is pronounced on the Nd—Fe—B magnets, where the surface grains are more affected by etching (pores, holes) than the interior grains.

After etching at 2 $mA \cdot cm^{-2}$ for 360 min, powders were collected. The magnetic fraction of the etched powder that was collected and separated via external permanent magnet is shown in FIG. 2c (BEI SEM). It can be observed that this collected powder consists of the grey phase and white phase and the magnetic grains of the grey phase are not connected with each other. The EDS result (EDS: Energy Dispersive X-ray Spectrometry) shows that the composition of the grey phase ($Nd_2Fe_{14}B$ matrix phase) and white phase (Nd-oxide, most probably $Nd_2O_3$) are similar to those in FIG. 2b. The measured grain size of the grey phase varies from 5 and 10 μm, which is consistent to the initial grain size of $Nd_2Fe_{14}B$ matrix phase in the pristine as-sintered magnet. Some pores/holes observed in each grey phase are possibly due to the etching of Nd-rich phase inside the grains. Based on the obtained results, 67.2% of Nd—Fe—B magnet were recovered in the form of the $Nd_2Fe_{14}B$ grains. FIG. 2d (BEI SEM) shows that the filtered particles are either the Nd-oxide phases (round particles) and Nd-based oxides and alloy phases (elongated ribbed particles), that resulted from the anodic etching of Nd-based alloy during electrolysis.

Figure 3:
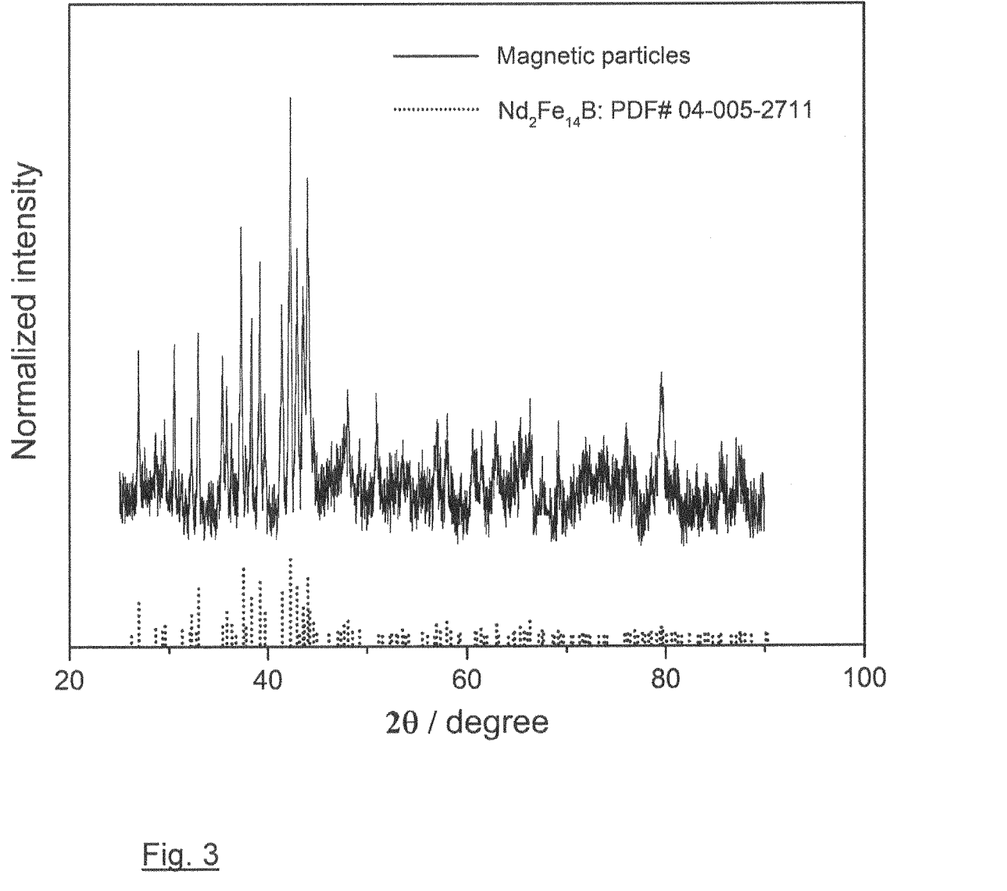
FIG. 3 XRD patterns of the collected magnetic particles in comparison with reflections characteristic of the $Nd_2Fe_{14}B$ phase.

An XRD pattern of the magnetic powders mainly shows reflections characteristic of $Nd_2Fe_{14}B$ phase (Reference PDF: 04-005-2711) (FIG. 3) which indicates that the grey phase in both FIGS. 2b and c is $Nd_2Fe_{14}B$ phase.

Figure 4:
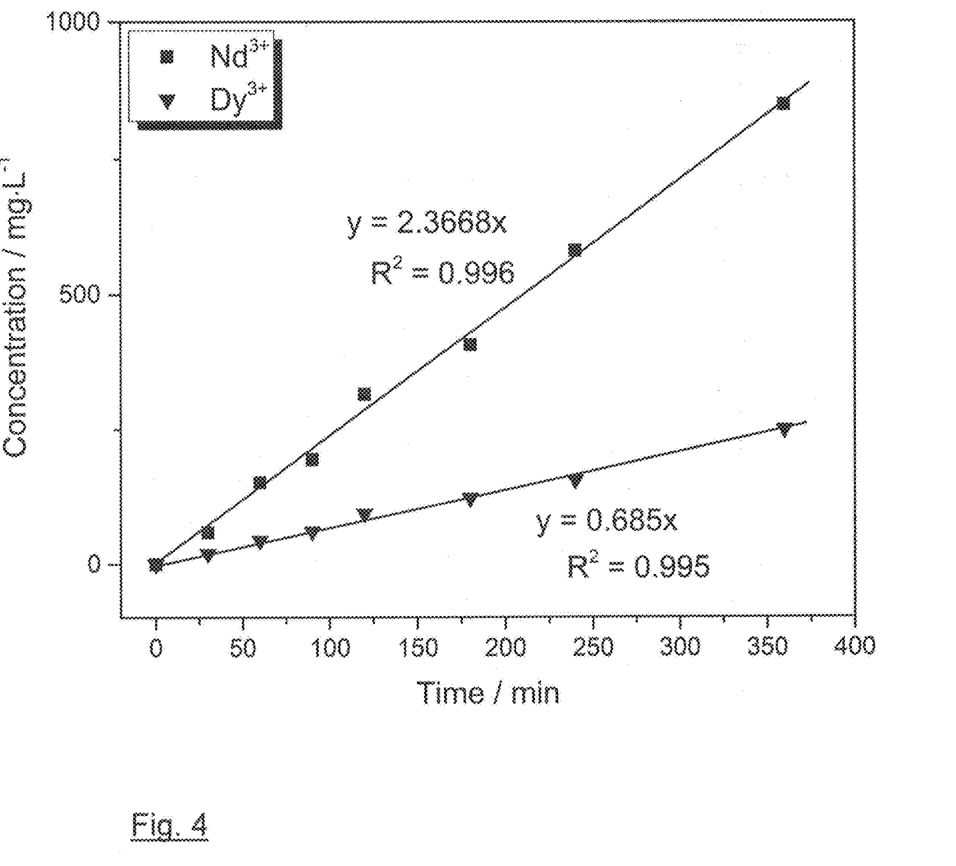
FIG. 4 a diagram showing the concentration of $Nd^{3+}$ and $Dy^{3+}$ in the electrolyte after electrochemical etching.

The etched Nd-rich phase which was dissolved in DMF after filtration was measured by ICP-MS (Inductively Coupled Plasma—Mass Spectrometry) (see FIG. 4). The etching rate of $Nd^{3+}$ and $Dy^{3+}$ were calculated as 2.3668 and 0.685 mg $L^{-1}$ $min^{-1}$, respectively.

REFERENCES

1. Yang, Y. X., et al., *REE Recovery from End-of-Life NdFeB Permanent Magnet Scrap: A Critical Review*. Journal of Sustainable Metallurgy, 2017. 3(1): p. 122-149.
2. Gutfleisch, O., et al., *Magnetic Materials and Devices for the 21st Century: Stronger, Lighter, and More Energy Efficient*. Advanced Materials, 2011. 23(7): p. 821-842.
3. Zhu, X. P., et al., *Solubility of RE2O3 (RE=La and Nd) in light rare earth fluoride molten salts*. Journal of Rare Earths, 2018. 36(7): p. 765-771.
4. Zhou, H., et al., *The recovery of rare earth by a novel extraction and precipitation strategy using functional ionic liquids*. Journal of Molecular Liquids, 2018. 254: p. 414-420.
5. Weng, Z., et al., *Assessing the energy requirements and global warming potential of the production of rare earth elements*. Journal of cleaner production, 2016. 139: p. 1282-1297.
6. Goodenough, K. M., F. Wall, and D. Merriman, *The rare earth elements: demand, global resources, and challenges for resourcing future generations*. Natural Resources Research, 2018. 27(2): p. 201-216,
7. Reck, B. K. and T. E. Graedel, *Challenges in metal recycling*. Science, 2012. 337(6095): p. 690-695.
8. Binnemans, K., et al., *Recycling of rare earths: a critical review*. Journal of cleaner production, 2013. 51: p. 1-22.
9. Venkatesan, P., et al., *Selective electrochemical extraction of REEs from NdFeB magnet waste at room temperature*. Green Chemistry, 2018. 20(5): p. 1065-1073.
10. Jin, H. Y., et al., *Life Cycle Assessment of Neodymium-Iron-Boron Magnet-to-Magnet Recycling for Electric Vehicle Motors*. Environmental Science & Technology, 2018. 52(6): p. 3796-3802.
11. Firdaus, M., et al., *Review of high-temperature recovery of rare earth (Nd/Dy) from magnet waste*. Journal of Sustainable Metallurgy, 2016. 2(4): p. 276-295.
12. Lalana, E. H., et al. *Recycling of Rare Earth Magnets by Hydrogen Processing and Re-Sintering. in European Congress and Exhibition on Powder Metallurgy. European PM Conference Proceedings*. 2016. The European Powder Metallurgy Association.
13. Zakotnik, M. and C. Tudor, *Commercial-scale recycling of NdFeB-type magnets with grain boundary modification yields products with 'designer properties' that exceed those of starting materials*. Waste management, 2015. 44: p. 48-54.
14. Zakotnik, M., I. Harris, and A. Williams, *Possible methods of recycling NdFeB-type sintered magnets using the HD/degassing process*. Journal of Alloys and Compounds, 2008. 450(1-2): p. 525-531.
15. Farr, M., *Production of anisotropic injection moulded NdFeB magnets from end-of-life sintered magnets*. 2018, University of Birmingham.
16. Lixandru, A., et al., *A systematic study of HDDR processing conditions for the recycling of end-of-life Nd—Fe—B magnets*. Journal of Alloys and Compounds, 2017. 724: p. 51-61.
17. Itoh, M., et al., *Recycling of rare earth sintered magnets as isotropic bonded magnets by melt-spinning*. Journal of alloys and compounds, 2004. 374(1-2): p. 393-396.
18. Meakin, J., et al., *3-D laser confocal microscopy study of the oxidation of NdFeB magnets in atmospheric conditions*. Applied Surface Science, 2016, 378: p. 540-544.
19. Zakotnik, M., I. Harris, and A. Williams, *Multiple recycling of NdFeB-type sintered magnets*. Journal of Alloys and Compounds, 2009. 469(1-2): p. 314-321.
20. Shirayama, S. and T. H. Okabe, *Selective Extraction and Recovery of Nd and Dy from Nd—Fe—B Magnet Scrap by Utilizing Molten MgCl2*. Metallurgical and Materials Transactions B-Process Metallurgy and Materials Processing Science, 2018, 49(3): p. 1067-1077.

21. Abbasalizadeh, A., et al., *Electrochemical Recovery of Rare Earth Elements from Magnets: Conversion of Rare Earth Based Metals into Rare Earth Fluorides in Molten Salts.* Materials Transactions, 2017. 58(3): p. 400-405.
22. Konishi, H., et al., *Electrochemical separation of Dy from Nd magnet scraps in molten LiCl-KCl.* Transactions of the Institutions of Mining and Metallurgy Section C-Mineral Processing and Extractive Metallurgy, 2016. 125(4): p. 216-220.
23. Fukumoto, M., Y. Sato, and M. Mara, *Recovery of Dy from a Mixture of Nd, Fe, B and Dy by Electrolysis in Molten LiCl.* Materials Transactions, 2016. 57(8): p. 1327-1331.
24. Yue, M., et al., *Recycling of Nd—Fe—B Sintered Magnets Sludge via the Reduction—Diffusion Route To Produce Sintered Magnets with Strong Energy Density.* ACS Sustainable Chemistry & Engineering, 2018. 6(5): p. 6547-6553.
25. Hua, Z., et al., *Selective extraction of rare earth elements from NdFeB scrap by molten chlorides.* ACS Sustainable Chemistry & Engineering, 2014. 2(11): p. 2536-2543.
26. Kitagawa, J. and R. Uemura, *Rare Earth Extraction from NdFeB Magnet Using a Closed-Loop Acid Process.* Scientific Reports, 2017. 7.
27. Holc, J., S. Beseničar, and D. Kolar, *A study of Nd2Fe14B and a neodymium-rich phase in sintered NdFeB magnets.* Journal of Materials Science, 1990. 25(1): p. 215-219.
28. Ramesh, R., J. Chen, and G. Thomas, *On the grain-boundary phase in iron rare-earth boron magnets.* Journal of applied physics, 1987. 61(8): p. 2993-2998.
29. Wang, S. and Y. Li, *In situ TEM study of Nd-rich phase in NdFeB magnet.* Journal of Magnetism and Magnetic Materials, 2005. 285(1-2): p. 177-182.

The invention claimed is:

1. A method for recovery of $Nd_2Fe_{14}B$ grains from bulk sintered Nd—Fe—B magnets and/or magnet scraps, in which method the Nd—Fe—B magnets and/or magnet scraps are anodically oxidized using a non-aqueous liquid electrolyte, said anodic oxidation releasing the $Nd_2Fe_{14}B$ grains in said Nd—Fe—B magnets and/or magnet scraps, wherein the released $Nd_2Fe_{14}B$ grains are collected magnetically during and/or after said anodic oxidation.

2. The method according to claim 1, characterized in that said anodic oxidation is performed in an electrochemical cell having an anode at least in part formed of said Nd—Fe—B magnets and/or magnet scraps.

3. The method according to claim 2, characterized in that a cathode of the electrochemical cell is formed of Cu.

4. The method according to claim 1, characterized in that said anodic oxidation is performed in a three-electrode electrochemical cell having an anode at least in part formed of said Nd—Fe—B magnets and/or magnet scraps, a cathode and a reference electrode.

5. The method according to claim 4, characterized in that the cathode is formed of Cu and the reference electrode is formed of a Pt material.

6. The method according to claim 1, characterized in that a non-aqueous solvent in which etched Nd-rich phases of the Nd—Fe—B magnets and/or magnet scraps dissolve is used as said liquid electrolyte.

7. The method according to claim 6, characterized in that the Nd-rich phases dissolved in the liquid electrolyte are also recovered by separating said Nd-rich phases from the electrolyte.

8. The method according to claim 1, characterized in that dimethylformamide is used as said liquid electrolyte.

9. The method according to claim 1, characterized in that an additive compound is added to said liquid electrolyte in order to enhance electrical conductivity of the electrolyte.

10. The method according to claim 9, characterized in that 0.05-0.3 mol $L^{-1}$ $FeCl_2$ is added as said additive compound.

11. The method according to claim 1, characterized in that the anodic oxidation is carried out at a temperature in a range between 0° C. and about 90° C.

* * * * *